United States Patent
Stern

(10) Patent No.: US 7,761,407 B1
(45) Date of Patent: Jul. 20, 2010

(54) USE OF PRIMARY AND SECONDARY INDEXES TO FACILITATE AGGREGATION OF RECORDS OF AN OLAP DATA CUBE

(75) Inventor: Ulrich Stern, San Mateo, CA (US)

(73) Assignee: Medallia, Inc., Menlo Park, CA (US)

( * ) Notice: Subject to any disclaimer, the term of this patent is extended or adjusted under 35 U.S.C. 154(b) by 731 days.

(21) Appl. No.: 11/546,126

(22) Filed: Oct. 10, 2006

(51) Int. Cl.
*G06F 17/00* (2006.01)

(52) U.S. Cl. .................................... 707/602

(58) Field of Classification Search ............ None
See application file for complete search history.

(56) References Cited

U.S. PATENT DOCUMENTS

| | | | |
|---|---|---|---|
| 6,014,669 A | 1/2000 | Slaughter et al. ............ 707/10 |
| 6,182,061 B1 | 1/2001 | Matsuzawa et al. ............ 707/2 |
| 6,546,403 B1 | 4/2003 | Carlson, Jr. et al. ......... 707/202 |
| 2004/0098359 A1 | 5/2004 | Bayliss et al. ................. 707/1 |

OTHER PUBLICATIONS

Rao, Jun and Ross, Kenneth A., "Cache Conscious Indexing for Decision-Support in Main Memory," Columbia University Technical Report CUCS-019-98, Dec. 1, 1998, pp. 0-17.
Rao, Jun and Ross, Kenneth A., "Cache Conscious Indexing for Decision-Support in Main Memory," Proceedings of the 25th VLDB Conference, 1999, pp. 78-89.
Luk, Wo-Shun, "Main-Memory & Near-Main-Memory OLAP Databases," Powerpoint presentation, Simon Fraser University, pp. 1-26.
Ross, Kenneth A. and Zaman, Kazi A., "Serving Datacube Tuples from Main Memory," Columbia University Technical Report CUCS-014-00, 2000, 17 pages.

*Primary Examiner*—Kavita Padmanabhan
(74) *Attorney, Agent, or Firm*—David R. Graham

(57) ABSTRACT

Systems or apparatus, methods, data structures and/or computer programs are provided for implementing an OLAP system that has increased query execution speed, requires reduced data storage capacity for an OLAP system and/or facilitates scaling of an OLAP system to large data cubes. The OLAP system can advantageously be implemented as an all-main memory OLAP system.

21 Claims, 15 Drawing Sheets

Cube array 401

| Record1 |
|---|
| Record2 |
| ... |

Record array 402

| Atom1 | Atom2 | ... | A.3 | ... | Atom6 |
|---|---|---|---|---|---|
| Atom7 | | | | | |
| ... | | | | | |

403
404

Word1
Word2
...

FIG. 4B

Value Encoding (Atom 'Item')

| Value / Member | Encoding | |
|---|---|---|
| | dec. | 2-bit |
| NULL | 0 | 00 |
| PC | 1 | 01 |
| Printer | 2 | 10 |

FIG. 4C

AtomInfo array

| WordOffset | BitShift | BitMask | Atom1 |
|---|---|---|---|
| WordOffset | BitShift | BitMask | Atom2 |
| | ... | | ... |

FIG. 4D

Atoms

| Name | Members |
|---|---|
| Time | Jan, Feb, ... |
| Gender | Female, Male |
| Service | Score 1-10 |
| Accommodation | Score 1-10 |
| Problems | Yes, No |
| ResponseId | 1,2,... |

FIG. 5A

Desired Result Table

Males guests:

| | Jan | Feb | Mar |
|---|---|---|---|
| Service | 7.2 | 7.4 | 7.4 |
| Accommodation | 7.1 | 7.1 | 7.1 |
| Problems | 30% | 29% | 29% |

FIG. 5B

Query

FILTERS: Gender, Male
COLUMNS: Time | Jan | Feb | Mar
ROWS: Service, Accommodation | AVG || Problems | TOP | Yes | No

FIG. 5C

CreateIndexes()

| sort Cube by Primary Atoms and then Secondary Atoms create PrimaryIndexes array |
|---|

FIG. 9A

PrimaryIndexes array for single Atom (Values 0..A)

| FirstRecord(0) |
|---|
| FirstRecord(1) |
| ... |
| FirstRecord(A) |

FIG. 9B

PrimaryIndexes array for Atoms 1 and 2 (Values $0..A_1$ and $0..A_2$)

| FirstRecord(0,0) |
|---|
| FirstRecord(0,1) |
| ... |
| FirstRecord($0,A_2$) |
| FirstRecord(1,0) |
| ... |
| FirstRecord($A_1,A_2$) |

FIG. 9C

AggregateCube()

for each value v that passes Primary Filter
    determine indexes (f, l) of first and last records using PrimaryIndex array
    if (no Secondary Filter)
        for each Record from f to l
            FilterAggregate(Record)
    else
        for each range of values $(v_1, v_2)$ that passes Secondary Filter
            determine index i of some record in the range using binary search
            if (search successful)
                AggregateSequence(i – 1, down)
                AggregateSequence(i, up)

AggregateSequence(firstRecord, direction)

for each Record starting with firstRecord in the given direction until out of
    value range $(v_1, v_2)$ or out of index range (f, l)
    FilterAggregate(Record)

FIG. 10

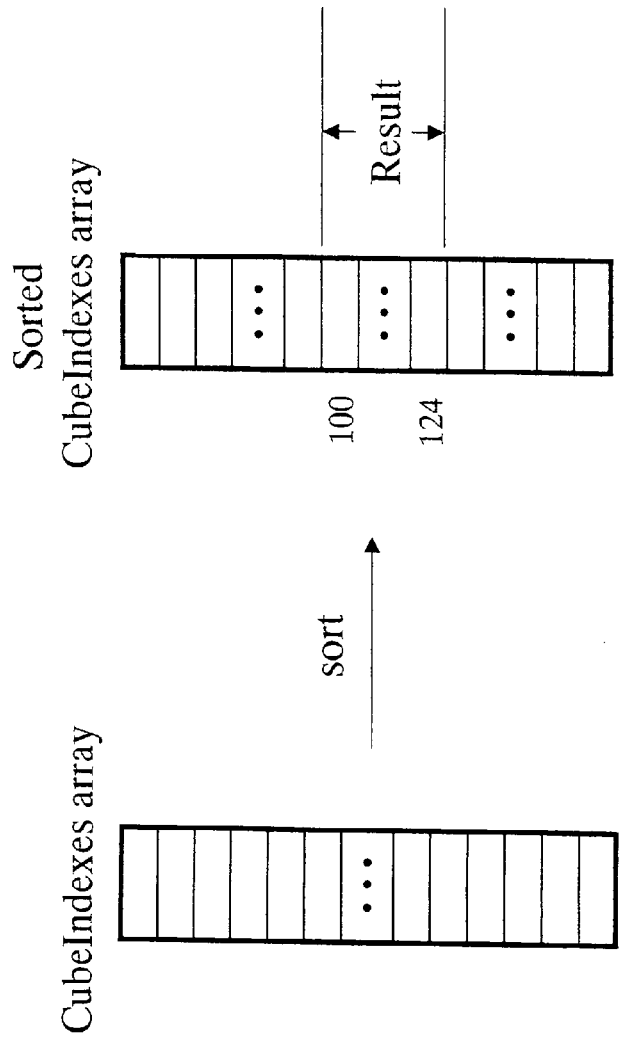

USE OF PRIMARY AND SECONDARY INDEXES TO FACILITATE AGGREGATION OF RECORDS OF AN OLAP DATA CUBE

BACKGROUND OF THE INVENTION

1. Field of the Invention

This invention relates to on-line analytical processing (OLAP) systems and, in particular, to an all-main memory OLAP system. The invention relates to systems, methods, data structures and/or computer programs for implementing an OLAP system that enable increased query execution speed, require reduced data storage capacity and/or facilitate scaling of an OLAP system to large data cubes.

2. Related Art

There are two major categories of database systems: on-line transaction processing (OLTP) systems and on-line analytical processing (OLAP) systems. Typically, data in OLTP systems is updated often and accessed with simple queries, while data in OLAP systems is updated infrequently and accessed with complex queries. An online travel store, for example, could update its OLTP system for each ticket purchase, while its OLAP system, which is used by the store's management to analyze ticket purchases over time based on customer profiles, is updated once a week. OLAP systems are also known as multidimensional database systems.

Minimizing query execution time is important for both OLTP and OLAP systems. To speed up query execution, conventional OLAP systems pre-calculate aggregations (or materialized views) of the data they manage. Queries that can be answered using stored aggregations alone execute very quickly. In practice, however, it is typically infeasible to pre-calculate all aggregations necessary to make each query fast. As a result, OLAP systems are typically characterized by long query execution times.

One approach that has been used to speed up query execution in OLTP systems is to store all data of a database in main memory, instead of only storing all of the data on a non-volatile data storage medium such as a magnetic disk (or other data storage medium from which data can be accessed less quickly than from main memory), and optimize query execution procedures for all-main memory operation. For an OLAP system, however, an all-main memory approach is made difficult by the typically very large amount of data with which the system interacts.

FIGS. 1 and 2 illustrate aspects of a conventional OLAP system, many of which can also be used with the present invention, as will be appreciated from the description below. FIG. 1 is a block diagram illustrating a conventional OLAP system and the operation thereof. FIG. 2 illustrates an example of multidimensional data that could be stored in an OLAP system, the multidimensional data described by a cube (also referred to as a fact table), an aggregation and a dimension hierarchy of the OLAP system.

Referring to FIG. 1, an OLAP system 100 includes a query executer 101, an updater 102 and a database 103 including multidimensional data. To use the OLAP system 100, a client application 110 (which can be any computer program(s), such as the online travel store discussed above, the use of which entails ascertaining information regarding the data stored in a database) submits a query to the query executer 101. After parsing the query, the query executer 101 calculates the query result, using the multidimensional data stored in the database 103 (which can include a cube 103a and aggregations 103b, as discussed further below with respect to FIG. 2). The updater 102 updates the multidimensional data in the database 103 on an ongoing basis (which is relatively infrequently, typically daily or weekly) based on the current state of the data warehouse 120, which is continually revised as new data is produced and/or existing data changes. The update process can be sped up by using incremental updating, which considers only the data that has been added to the data warehouse 120 since the last update.

FIG. 2 illustrates an example of multidimensional data that might be generated by a chain store selling personal computers (PCs) and printers. The multidimensional data is stored in a cube 201, a part of which is shown in FIG. 2. Each row of the cube 201 represents a record. Each record (records 201a, 201b, 201c and 201d are shown in FIG. 2) represents the sales of a particular item (PC or printer) in a particular store (data for two stores, store A and store B, is shown in the part of the cube illustrated in FIG. 2) for a particular month (data for two months, January and February, is shown in the part of the cube illustrated in FIG. 2). Each column of the cube 201 represents a data variable of interest. The columns of the cube in a conventional OLAP system can be of two types: dimensions and measures. A dimension is a column of a cube that can be eliminated ("rolled up") when an aggregation is calculated. (At least one dimension is rolled up for each aggregation.) A measure is a column of a cube whose values are aggregated. Aggregations include operations such as, for example, "sum," "min" and "count." In FIG. 2, an aggregation 202 is illustrated (for the part of the cube illustrated in FIG. 2) in which sales of each item at each store are summed over all times (the dimension Time is rolled up and the measure Sales is summed).

The values of a dimension can be arranged in a hierarchy having several levels. Each dimension typically has at least two levels: an "All" level that includes all the dimension values and one or more levels that each include subsets of the dimension values. As illustrated in FIG. 2, the values of the Time dimension are arranged in a hierarchy 203 including three levels: All, Year and Month. The number of possible aggregations of a cube is the product of the numbers of levels for each dimension, e.g., if a cube includes first, second and third dimensions that are arranged in hierarchies of 3, 4 and 4 levels, respectively, the number of possible aggregations of the cube is 48 (3×4×4). The Time dimension, for example, contributes a factor of three to the number of possible aggregations of the cube illustrated in FIG. 2, corresponding to whether the Time dimension is rolled up to the All, Year or Month level, i.e., aggregated over all time, aggregated by year or aggregated by month, respectively. Typically, the number of possible aggregations of a cube is huge, making pre-computing all aggregations impractical. As indicated above, this inhibits the effectiveness of previous approaches to speeding up query execution in conventional OLAP systems by pre-calculating aggregations.

SUMMARY OF THE INVENTION

The invention provides systems or apparatus, methods, data structures and/or computer programs for implementing an on-line analytical processing system (OLAP) system that enable increased query execution speed, require reduced data storage capacity for the OLAP system and/or facilitate scaling of the OLAP system to large data cubes. The invention can advantageously be implemented as an all-main memory OLAP system.

One aspect of the invention is an all-main memory OLAP system, as well as methods, data structures and/or computer programs for implementing such an OLAP system. In an all-main memory OLAP system, all of the cube and associated metadata are stored in main memory. In particular, the invention provides data structures and methods that enable implementation of an all-main memory OLAP system. The invention advantageously enables substantial reduction of both main memory requirements (to enable handling of large data volumes) and query execution time. The managed data can be stored in a compact representation, in which individual data values are encoded with the minimally required number of bits. A data structure that enables fast access to individual data values can be computed as part of the metadata associated with a database. Additionally, several query-specific auxiliary data structures can be pre-computed during query parsing to reduce the runtime of the remainder of query execution. Arrays can be used in these data structures to provide very fast implementations of sets and mapping functions.

Another aspect of the invention is a method for implementing indexes with very low main memory requirements. To create an index for a single column, the stored records can be sorted according to this column. Then the position of only the first record with a particular column value needs to be stored. Since in OLAP systems the number of possible values of a column is typically several orders of magnitude smaller than the number of records, significant main memory savings can be achieved. The sorting index method can be extended to more than one index. It can also—with a small execution time cost—use binary search or dictionary search to find records and not store any record positions at all.

Another aspect of the invention is a method to support large query result sets. The presented OLAP query language enables requesting a slice of the result set by specifying the first row and the number of rows to be returned. (SQL, the standard query language of OLTP systems, supports only a subset of this functionality, namely, requesting the top N rows to be returned.) Result set slices are most useful for an ordered result set. The invention can be implemented to make use of a data structure that enables sorting and slicing a result set with low memory overhead. In one embodiment of the invention, a method for presenting a result of an OLAP query includes the steps of producing a result table having multiple rows, identifying a subset of the rows of the result table (a result table "slice"), and providing the subset of the rows of the result table as the result of the OLAP query. The subset of rows can be one or more groups of contiguous rows of the result table or rows of the result table spaced at regular intervals. It is anticipated that typically the rows of the result table will be produced without aggregation of records; however, the invention can also be used to produce result table slices for result tables including rows produced with aggregation of records. The invention can further be implemented to enable navigation among result table slices in a manner similar to that used to navigate among pages of "hits" identified by a search engine.

Another aspect of the invention is a method to parallelize a main memory OLAP system to run on a cluster of computers (or nodes). A parallel OLAP system according to the invention can scale to a large data volume by using the combined main memory of a large number of nodes. Records can be assigned uniformly at random to the nodes, which results in randomized load balancing and enables close-to-linear speedups for query execution. This aspect of the invention can be implemented so that nodes communicate little during query execution, resulting in modest network bandwidth requirements. Additionally, a parallel OLAP system according to the invention can be implemented to automatically recover from node failures, making the system highly reliable. In one embodiment of the invention, an OLAP system includes a master node, a distributor node and multiple aggregator nodes. The master node can define partitions of an OLAP data cube, assign each cube partition to an aggregator node, and effect transmission of data representing each cube partition to the aggregator node to which the cube partition is assigned. The distributor node can receive a query transmitted from a client application and transmit the query to aggregator nodes. The distributor node can also receive a partial response to the query from each of multiple active aggregator nodes, combine the partial query responses to produce a complete response to the query, and transmit the complete query response to the client application. Each of the aggregator nodes can receive data representing a cube partition assigned to the aggregator node. Each aggregator node can also receive a query from a distributor node, execute the query with respect to the cube partition assigned to the aggregator node to produce a partial response to the query, and transmit the partial query response to a distributor node.

BRIEF DESCRIPTION OF THE DRAWINGS

FIGS. 4A through 4D illustrate an OLAP cube in accordance with an embodiment of the invention, including the structure of records in the cube, an example of atom value encoding and the structure of an atom value look-up table.

FIGS. 5A through 5C illustrate use of an OLAP system according to the invention to obtain information from a database, including atoms of a cube produced from the database, a desired result table and query elements that produce the result table.

FIG. 9A illustrates a procedure to create primary and secondary indexes for a cube.

FIGS. 9B and 9C illustrate data structures that can be used to implement a primary index or indexes.

FIG. 10 illustrates a procedure to aggregate a cube, using one primary and one secondary index.

FIG. 11A illustrates a query that returns a "slice" of a result table that includes unaggregated records.

FIG. 11B illustrates a data structure that can be used to enable result table sorting and to produce a result table slice.

FIG. 12 is a block diagram of a parallel OLAP system according to an embodiment of the invention.

DETAILED DESCRIPTION OF THE INVENTION

The invention provides systems or apparatus, methods, data structures and/or computer programs for implementing an on-line analytical processing system (OLAP) system that enable increased query execution speed, require reduced data storage capacity for the OLAP system and/or facilitate scaling of the OLAP system to large data cubes. The invention can advantageously be implemented as an all-main memory OLAP system.

I. Computer System

Figure 3:
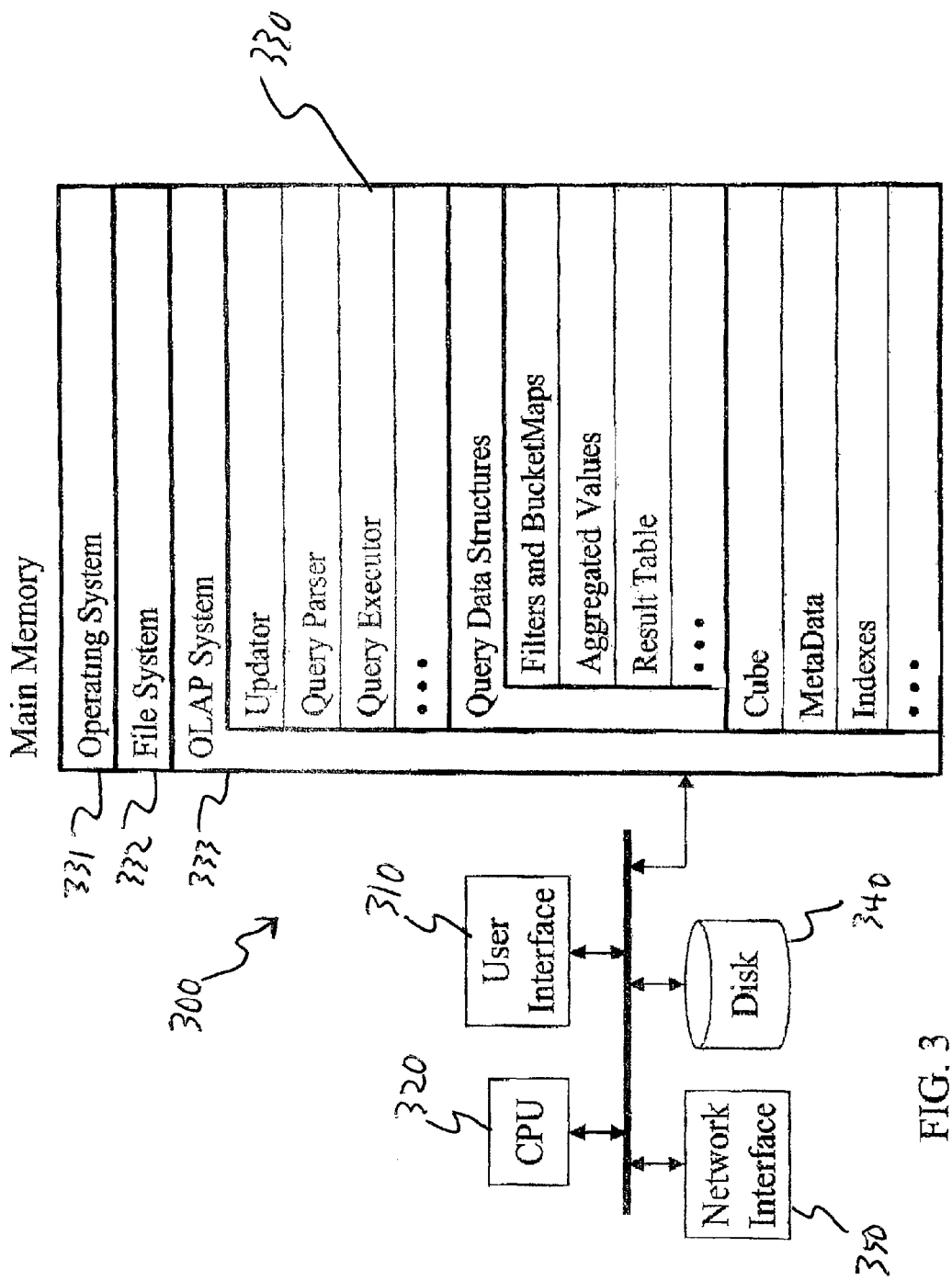
FIG. 3 illustrates a computer system on which the invention can be implemented.

FIG. 3 illustrates a computer system 300 on which the invention can be implemented and, in particular, the functional components that reside in the main memory of the computer system 300. In general, the invention can be implemented on any computer system (which can include one or more computers and/or other devices having computational capability) that produces the functionality of the invention as described herein; computer systems other than the computer system 300 can be used, as can readily be understood by those skilled in the art in view of the description herein. A computer system on which the invention can be implemented can be embodied by, for example, one or more desktop computers, server computers and/or portable computers (e.g., notebook computer, personal digital assistant). The computer system 300 includes user interface apparatus 310, processing device 320, main memory 330 (i.e., random access memory), non-volatile data storage device 340 (e.g., hard disk) and network interface apparatus 350, each of which can be implemented using any appropriate apparatus, as known to those skilled in the art. As can readily be appreciated, in embodiments of the invention that are a main memory OLAP system, it is desirable to implement the main memory 330 using main memory that has as large a data storage capacity, and is as rapidly accessible, as possible or practical. Additionally, the computer system 300 need not necessarily include a network interface apparatus 350 for embodiments of the invention other than embodiments of a parallel OLAP system according to the invention (described further below).

Stored in the main memory 330 are one or more computer programs and/or data structures (or part of one or more computer programs and/or data structure(s)) that embody an operating system 331, one or more computer programs and/or data structures (or part of one or more computer programs and/or data structure(s)) that embody a file system 332, and one or more computer programs and/or data structures (or part of one or more computer programs and/or data structure(s)) that embody an OLAP system 333 in accordance with the invention. The operating system 331 and the file system 332 can be implemented in any of a variety of known ways, as well understood by those skilled in the art.

The OLAP system 333 includes the following functional components: an updater, a query parser, a query executer, various query data structures such as Filters, BucketMaps, Aggregations and a Result Table, a cube, metadata associated with the cube and various indexes. Part or all of the updater, query parser and query executer can be implemented in a conventional manner. The query parser and/or query executer can be modified to accomplish functions of an OLAP system according to the invention, as described in more detail below. The query data structures, cube, metadata and indexes of an OLAP system according to the invention are also described in more detail below.

II. Data Structures and Procedures for use in an OLAP System According to the Invention FIGS. 4A through 4D, 5, 6, 7 and 8 illustrate data structures and procedures that can be used to implement an OLAP system in accordance with the invention and, in particular, a main memory OLAP system in accordance with the invention. Below, concrete examples accompany the conceptual description of aspects of the invention to simplify and facilitate explanation of the invention.

A. Cube

FIGS. 4A and 4B illustrate the structure of a cube 401 that can be used in an OLAP system according to the invention. As illustrated in FIG. 4A, the cube 401 includes an array of records 402. Each record 402 represents a particular combination of values of the variables used in the OLAP system. FIG. 4B illustrates the structure of a record 402. Unlike in a conventional OLAP system, in an OLAP system according to the invention no distinction need be made between dimensions and measures; in the remainder of this description, all variables of an OLAP system are referred to as atoms. This is because an OLAP system according to the invention does not perform pre-aggregations. (Previous OLAP systems typically attempt both to pre-aggregate over dimensions and to create indexes for most or all of the dimensions.) The data structures and methods described herein enable implementation of an all-main memory OLAP system without need to perform pre-aggregations. Thus, the invention can specify which atom (s) to aggregate in a query, without need to distinguish between dimensions and measures. Each record 402 of the cube 401 includes values of atoms 403. In general, an atom and its values can be shown on either the rows or the columns axis of the result table.

Figure 1:
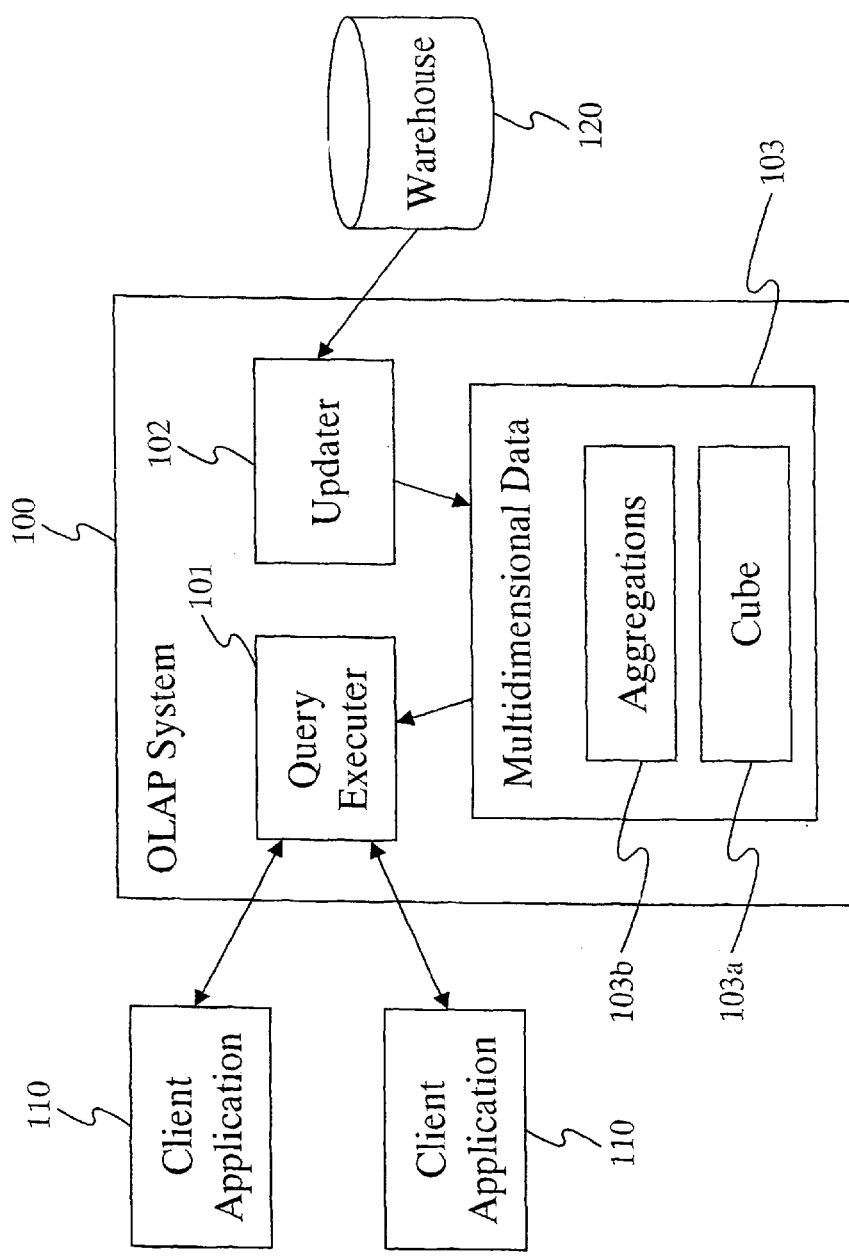
FIG. 1 is a block diagram illustrating a conventional OLAP system and the operation thereof.
Figure 2:
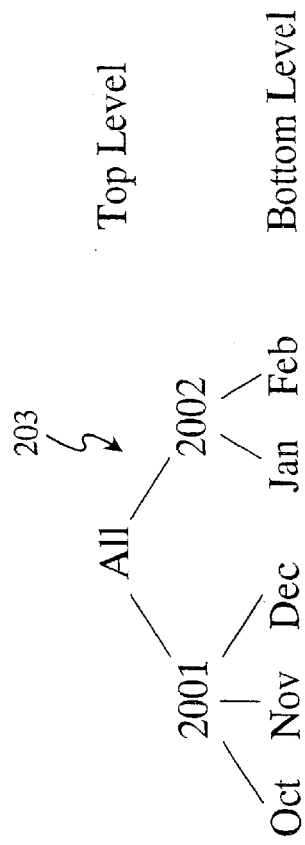
FIG. 2 illustrates an example of multidimensional data that could be stored in an OLAP system, the multidimensional data described by a cube (fact table), an aggregation and a dimension hierarchy of the OLAP system.

Each record 402 can be stored, for example, using one or more words 404, a commonly used unit for enabling access to main memory in a computer system. A word 404 includes a specified number of bits (e.g., 8, 16, 32). Each word 404 can include one or more atom values encoded using one or more bits of the word 404. FIG. 4C illustrates, for the example described above with respect to FIG. 2 of multidimensional data generated by a chain store selling personal computers (PCs) and printers, how atom values can be encoded for storage in a data storage device (e.g., main memory). An "Item" atom of the OLAP system represents sales of PCs or printers and can have a value of 0 (Null), 1 (PCs) or 2 (printers). The three possible values of the "Item" atom can be represented by a sequence of two bits; FIG. 4C indicates the particular bit sequence for each possible atom value. To pack as many atom values as possible into a word 404, the possible values of an atom can be encoded using the minimally required number of bits, which equals $[ld(n+1)]$ (i.e., the smallest integer that is at least $ld(n+1)$) for an atom having n possible values (and allowing a NULL value). For example, a value of an atom having 6 possible values can be encoded using a sequence of 3 bits, while a value of an atom having 25 possible values can be encoded using a sequence of 5 bits.

An atom value can be retrieved from a data storage device on which the cube is stored (e.g., main memory) using the atom value's word offset, bit shift and bit mask. The word offset of an atom value is the relative location in the data storage device of the word containing the atom value from the first word of the record. The bit shift of an atom value is the location in the word at which the atom value begins (e.g., the bit number of the first bit of a sequence of bits representing the atom value). The bit mask of an atom value is a value that can be used in a logical AND operation to filter out the atom value among the other atom values in the same word. These three values can be determined using a look-up table (sometimes referred to herein as the AtomInfo array), illustrated in FIG. 4D, that is part of the metadata associated with the cube and which can be pre-calculated when the cube is created. The use of the AtomInfo array as described above facilitates a memory-efficient representation of a cube and is therefore advantageous in creating a main-memory OLAP system.

B. Atoms, Queries and Result Tables

FIGS. 5A through 5C illustrate use of an OLAP system according to the invention to obtain information from a database. FIG. 5A illustrates the atoms of a cube in which each record corresponds to, for example, a response to a simple customer satisfaction survey that is used by a hotel. The value of the "Time" atom in a record indicates the month that the guest filling out the response stayed at the hotel. The value of the "Gender" atom indicates the sex of the hotel guest. The value of the "Service" atom indicates the satisfaction score (rating on a scale of 1-10) that the hotel guest gave to the hotel's service during the guest's stay. The value of the "Accommodation" atom indicates the satisfaction score (rating on a scale of 1-10) that the hotel guest gave to the hotel accommodations during the guest's stay. The value of the "Problem" atom indicates whether, the hotel guest had any problems during the guest's stay. The value of the "ResponseID" uniquely identifies each response to the customer satisfaction survey.

FIG. 5B illustrates a result table produced by a query having the elements illustrated in FIG. 5C that is executed on the cube including atoms as illustrated in FIG. 5A. The result table shows, over time and for male guests only, the average service satisfaction score (the row designated by "Service"), the average accommodation satisfaction score (the row designated by "Accommodation") and the percentage of guests that indicated they had a problem during their stay (the row designated by "Problem").

FIG. 5C illustrates elements of a typical OLAP query. (Unlike OLTP systems, which use a standard query language, SQL, there is no standard query language for OLAP systems; thus, FIG. 5C simply shows the elements of the query without formulating the elements in an expression in accordance with a particular query language.) The query illustrated in FIG. 5C includes elements that describe which subset of the records in the cube to use in producing the result table (the FILTERS element of the query illustrated in FIG. 5C), which atom(s) and values to show on the x-axis of the result table (the COLUMNS element of the query illustrated in FIG. 5C), and which atom(s) and values to show on the y-axis of the result table (the ROWS element of the query illustrated in FIG. 5C). In general, the values shown on an axis of the result table include atom values, aggregated values and/or calculated values. Other queries may omit element(s) of the query illustrated in FIG. 5C and/or include element(s) not shown in that query. For example, in queries that do not require aggregation, the ROWS element can be implicit (see the query illustrated in FIG. 11A, described below). Or, for example, a query that requires sorting of records can include a SORT element (again, see the query illustrated in FIG. 11A, described below).

In the query illustrated in FIG. 5C, the ROWS query element also describes what function (formula) to use for each row of the result table to calculate the entries in that row of the result table. Entries in the rows for average service satisfaction score and average accommodation satisfaction score are calculated using the AVG function, which sums all of the scores for that row in a particular column and divides the sum by the number of scores for that row and column. Entries in the row for percentage of guests having a problem during their stay are calculated using the TOP function, which classifies the values for each row and column combination into top and bottom boxes and determines the percentage of all values for that row and column that are classified in the top box. As illustrated in FIG. 5C, the values for the "Problem" atom are classified into top and bottom boxes, respectively, in the order in which the values appear after the TOP keyword.

The result table of FIG. 5B is two-dimensional; however, in general, a result table produced by an OLAP system according to the invention can be n-dimensional, though more than 3 dimensions may be difficult or impossible to visualize. Thus, in general, a query includes, for each dimension of the result table, a corresponding element that specifies which atom(s) and values to show along that dimension of the result table.

C. Query Execution Procedures

Figure 6:
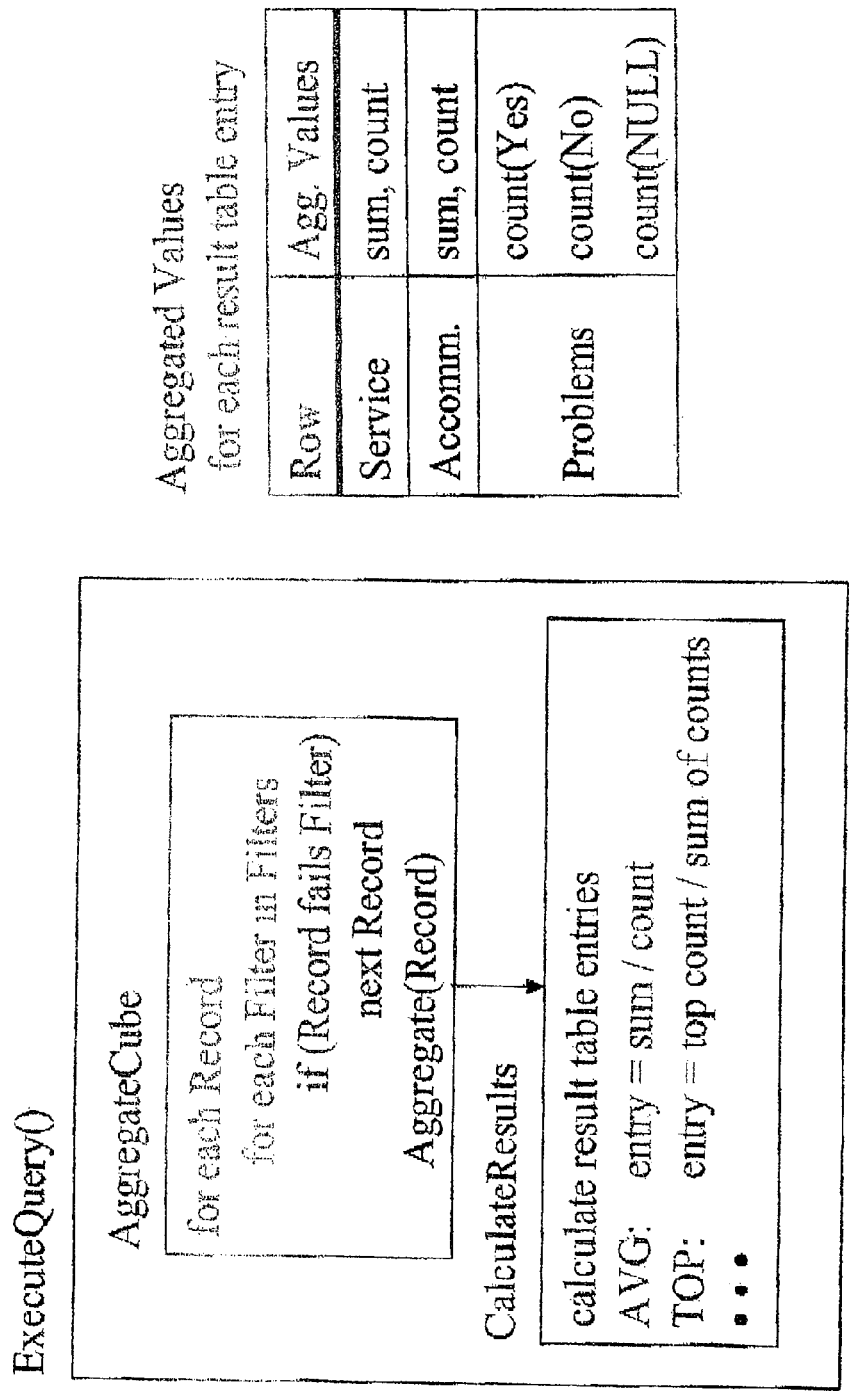
FIG. 6 illustrates a part of a procedure to execute a query in accordance with an embodiment of the invention, as well as the aggregated values that are determined for each entry of the result table of FIG. 5B.

FIG. 6 illustrates a part of a procedure to execute a query in accordance with an embodiment of the invention (the lefthand side of FIG. 6), as well as the aggregated values that are determined for each entry of the result table of FIG. 5 (the righthand side of FIG. 6). The part of the query execution procedure illustrated in FIG. 6 assumes that the query has already been parsed successfully and that several auxiliary data structures (discussed in more detail below) have been created during (or after) the parsing. Execution of the query to produce the result table of FIG. 5 is performed in two steps. In the first step (AggregateCube in FIG. 6), aggregated values are calculated for each result table entry. In the second step (CalculateResults in FIG. 6), the value of each result table entry is calculated from the aggregated values. For rows of the result table of FIG. 5 in which the function AVG is used to calculate the value of the result table entry (i.e., the rows for average service satisfaction score and average accommodation satisfaction score), the aggregated values "sum" and "count" are determined for each result table entry in the first step of the query execution procedure, and the value of the result table entry is calculated as sum/count in the second step of the query execution procedure. For rows of the result table of FIG. 5 in which the function TOP is used to calculate the value of the result table entry (i.e., the row for percentage of guests having a problem during their stay), in the first step of the query execution procedure, for each result table entry the aggregated value "count" is determined for each possible value of the atom corresponding to that row (including a value), and in the second step of the query execution procedure, the value of the result table entry is calculated as top count/sum of counts. Aggregation typically requires much more time than calculation, since the aggregation needs to loop over all of the cube's records (of which there are typically a large number), while calculation needs to loop over each result table entry only (of which there are typically a modest number). Implementation of an OLAP system according to the invention to enable (typically significant) reduction of the execution time required for aggregation is described below with respect to FIGS. 7 and 8.

D. Filters

Figure 7:
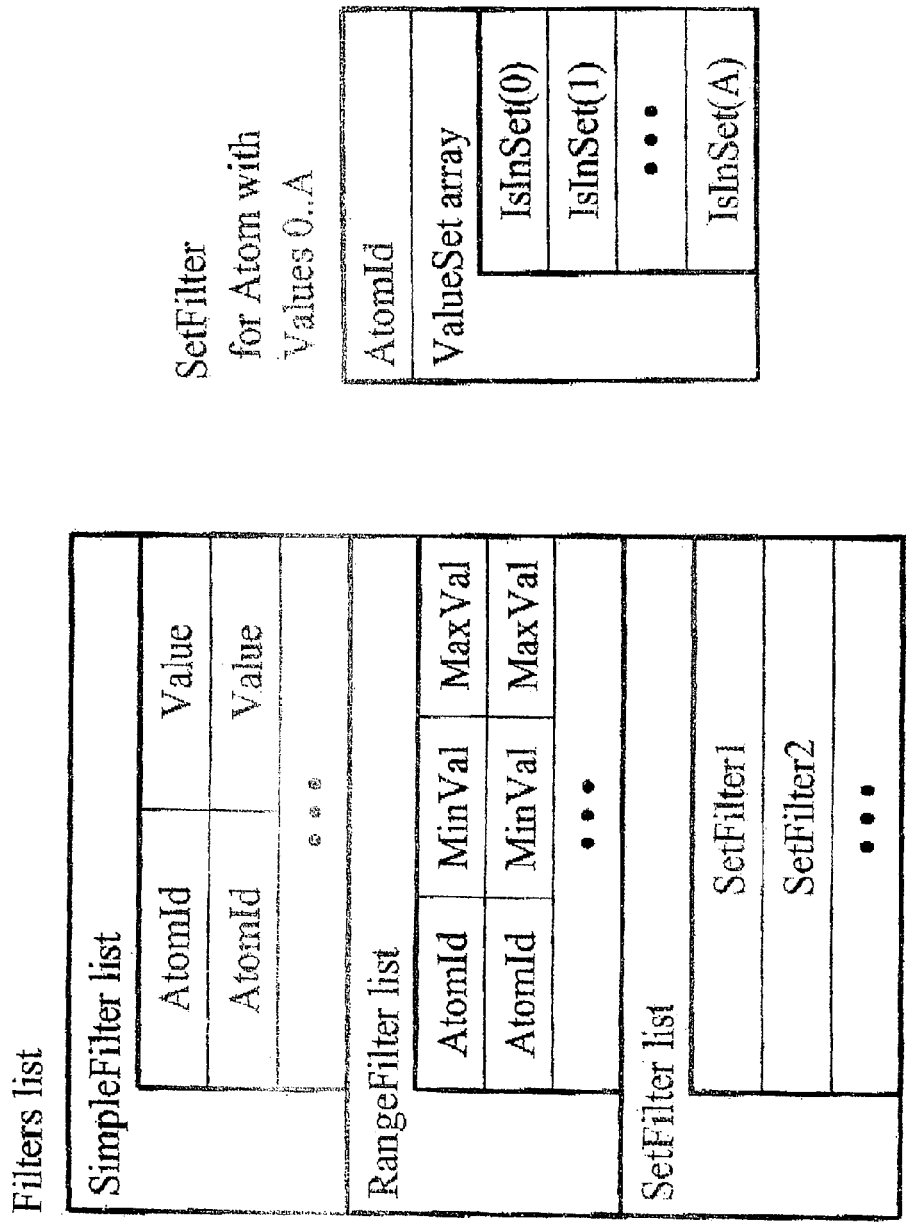
FIG. 7 illustrates auxiliary data structures that can be created for use by an OLAP system according to the invention in filtering the records of a cube to identify records to be used in aggregation and/or calculation.

FIG. 7 illustrates auxiliary data structures (filter data structures) that can be created for use by an OLAP system according to the invention in executing a FILTERS element of a query, i.e., in filtering the records of a cube to identify records to be used in aggregation and/or calculation parts of the query.

In general, the filter data structures can be created by any part of the OLAP system that can operate before query execution to create the filter data structures. A query parser, for example, of an OLAP system according to the invention can be implemented to produce filter data structures for use by the OLAP system. In FIG. 7, filter data structures are illustrated for three types of filters: 1) a simple filter, for which the value of each of one or more atoms of a record must match a corresponding specified value for that atom; 2) a range filter, for which the value of each of one or more atoms of a record must lie within a corresponding specified range of values for that atom; and 3) a set filter, for which the value of each of one or more atoms of a record must match one value of a corresponding specified set of values for that atom. Each type of filter data structure (simple, range, set) can define one or more filters. A simple filter data structure can be implemented using an n×2 array that includes a list of n atoms (each atom being used to define one simple filter) and the corresponding atom value(s) that must be matched to pass the filter(s). Similarly, a range filter data structure can be implemented using an n×3 array that includes a list of n atoms (each atom being used to define one range filter) and the minimum and maximum atom values of the corresponding filtering range(s) within which atom value(s) must lie to pass the filter(s). To enable quick determination of whether a record passes one or more set filters, a set filter data structure can be implemented using an array (SetFilter array) for each set filter that allows as index values all possible atom values for the atom being used to define the set filter (filtering atom) and contains indications (e.g., Boolean values) of whether or not the atom (index) value is in the set of atom values that must be matched to pass the filter. Typically, the number of possible atom values for the filtering atom is small. Using a SetFilter array as described above, whether a record passes one or more set filters can be determined using a single operation (i.e., accessing the appropriate element of the SetFilter array using the atom value(s) as an index into the array), as opposed to the multiple operations that would be required to compare the atom value(s) to each atom value or combination of atom value(s) in the list of possible atom values that define the set filter. For a large number of possible values of the filtering atom and a set filter for, which only a small fraction of the possible values passes (or fails), the set filter can be implemented using a hash table instead of an array, which results in reduced performance (i.e., speed with which the filtering operation is performed) but saves memory.

E. Aggregation

Figure 8:
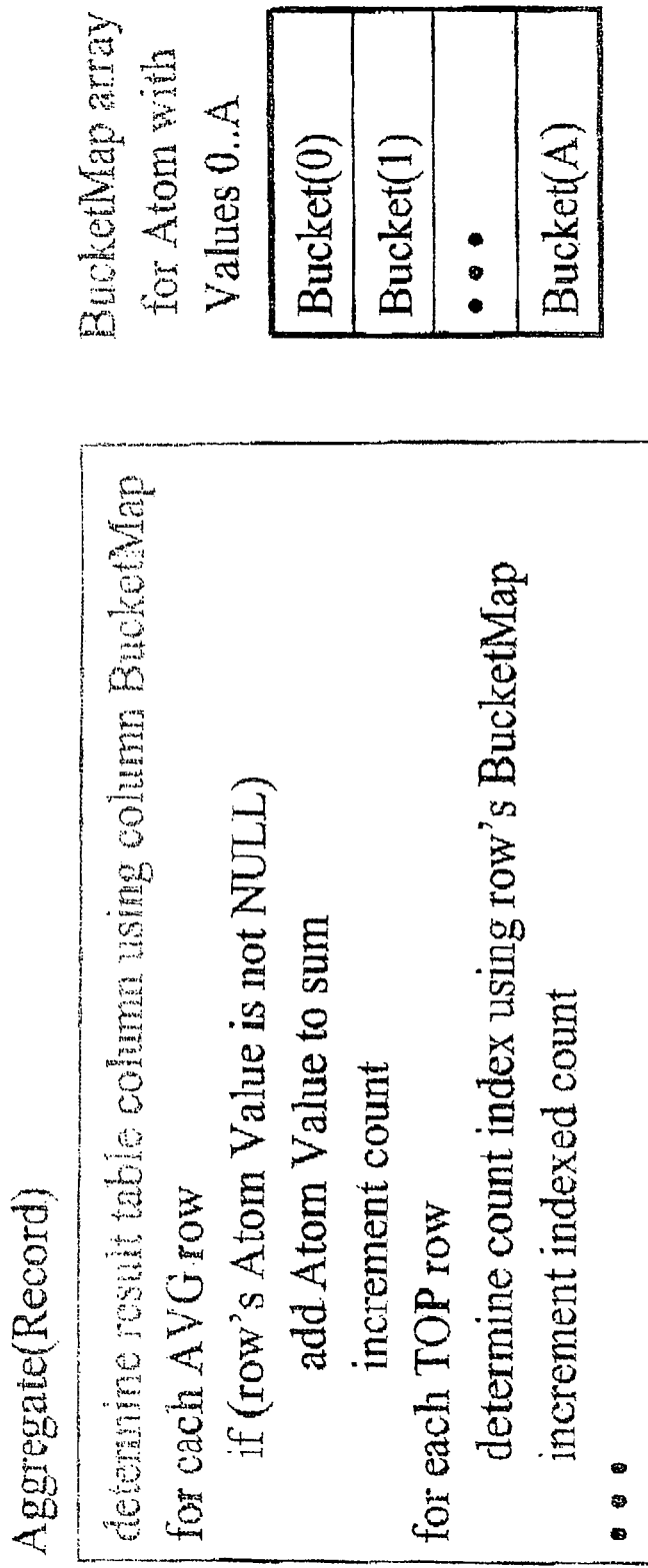
FIG. 8 illustrates a procedure to aggregate the atom values of a record of a cube, as well as an auxiliary data structure that can be used to speed up execution of the procedure.

FIG. 8 illustrates a procedure to aggregate the atom values of a record of a cube (the lefthand side of FIG. 8), as well as an auxiliary data structure that can be used to speed up execution of the procedure (the righthand side of FIG. 8). The procedure first determines which result table column the record falls into. After the result table column for a record is determined, the procedure updates, for each row of the result table, the aggregated value or values used in computing the result table entry for that combination of column and row.

Each result table column corresponds to a value or values of an atom or atoms (for convenience, such atom(s) are sometimes referred to herein as column atom(s)) that are used to define columns in the result table (e.g., when a Time atom is used to define columns in the result table, each column can correspond to a particular day, week, month or year). Determination of the appropriate result table column for a record can be accomplished by comparing the value(s) of the column atom(s) for that record to each of the value(s) of column atom(s) that define a column in the result table. The amount of time required to determine the appropriate result table column for a record in this way increases with each additional column that is included in the result table.

The invention can advantageously be implemented (particularly for applications in which it is anticipated that the result table(s) will include a large number of columns) to make use of an auxiliary data structure (referred to herein as a BucketMap array) that can be created to increase the speed with which the appropriate result table column for a record is identified. The BucketMap array maps each column atom value or combination of values of column atoms to the column defined by that value or values. An OLAP system according to the invention can be implemented so that the BucketMap array is generated by a query parser of the OLAP system. FIG. 8 illustrates a BucketMap array for a result table in which each column is defined by the value of a single atom which can have a value between 0 and A. Each element of the BucketMap array (i.e., Bucket (0), Bucket(1) . . . Bucket(A)) is an identifier of the result table column defined by a particular atom value. For example, for the result table illustrated in FIG. 5B, the BucketMap array can map January, February and March to columns 1, 2, and 3, respectively. Using a BucketMap array as described above, the result table column for a record can be determined using a single operation (i.e., accessing the appropriate element of the BucketMap array using the atom value(s) as an index into the array), as opposed to the multiple operations that are typically required using the alternative approach described above.

The aggregation speed can be further increased by implementing an OLAP system according to the invention (e.g., implementing a query parser of the OLAP system) to include one or more filters that operate with respect to the column atom(s) to let only atom value(s) used to define columns in the result table (e.g., January, February and March in the result table illustrated in FIG. 5B) pass the filter for further use in identifying the appropriate result table column for a record. Typically, range and/or set filter(s) are used for this purpose. Such filter(s) can be used together with any method for identifying the result table column for a record (e.g., either of the two methods described above). When such filter(s) are used, the procedure of FIG. 8 would not be performed for records having column atom value(s) that are not part of the result table.

As indicated above, after the result table column for a record is determined, the procedure updates, for each row of the result table, the aggregated value or values used in computing the result table entry for that combination of column and row. FIG. 8 illustrates a procedure that can be used to produce the result table of FIG. 5B. For AVG rows (e.g., the Service and Accommodation rows in the result table of FIG. 5B), the procedure of FIG. 8 aggregates, for the records to be included in a particular column, both the atom values for those records (the aggregated value "sum," see FIG. 6) and the number of records (the aggregated value "count," see FIG. 6). For TOP rows (e.g., the Problems row in the result table of FIG. 5B), the procedure of FIG. 8 aggregates, for the records to be included in a particular column, the number of records having each possible atom value.

As can be seen in the case of a TOP row, the computation of some result table entries may require aggregation of the number of records having each of multiple different atom values or combination of atom values (i.e., aggregation of multiple "count" values). In a manner similar to that described above with respect to determination of the appropriate result table column for a record, the determination of which of multiple "count" values to increment for a particular record can be speeded up using a BucketMap array. For this purpose, the BucketMap array maps each atom value or combination of atom values to the corresponding count value. An OLAP system according to the invention can be implemented so that this type of BucketMap array can also be generated by a query parser of the OLAP system. For example, for the result table illustrated in FIG. 5B, the BucketMap array can map each of the three atom values for the Problems atom, i.e., Yes, No and NULL, to corresponding count values, i.e., the aggregated values "count(YES)," "count(NO)" and "count (NULL)" respectively. Using a BucketMap array to determine which of multiple "count" values to increment for a particular record can speed up such determination because a single operation is used to make the determination (i.e., accessing the appropriate element of the BucketMap array using the atom value or combination of atom values as an index into the array), as opposed to the multiple operations that would be required if each atom value or combination of atom values was compared to the atom value(s) corresponding to each count value.

III. Indexes

FIGS. 9A, 9B, 9C and 10 illustrate how the above-described core data structures and procedures of an OLAP system according to the invention can be augmented with one or more indexes that facilitate implementation of the OLAP system and, in particular, implementation of the OLAP system in main memory. The indexes can be pre-computed. As described above, an OLAP system according to the invention can include one or more filters that are used to identify a subset of the records in the cube to use during aggregation. The index(es) described below can speed up query execution by reducing the time spent to identify records that pass the filter(s). In general, the records of the cube are first sorted according to the values of one or more atoms for which a filter is commonly applied. An index can then be created which constitutes a compact representation of the locations in the sorted cube of records based on the values of the filtering atom(s). The filter(s) need then be applied only to a possibly small subset of the records of the cube (found by using the index), greatly increasing the speed with which the filtering operation can be performed. Two types of indexes can be used in an OLAP system according to the invention: primary indexes and secondary indexes. Primary indexes are faster than secondary indexes, but, when an OLAP system according to the invention is implemented in min memory, primary indexes can incur some main memory requirements (i.e., storage capacity) while secondary ("virtual") indexes incur no such requirements. FIG. 9A illustrates a procedure to create primary and secondary indexes for a cube.

FIGS. 9B and 9C illustrate data structures that can be used to implement a primary index or indexes. A primary index or indexes can be implemented using an array in which each element of the array represents the location (e.g., main memory address) in a cube of the first record in a contiguous range of records having the same value(s) for one or more atoms (the "primary index atom(s)"). A single primary index can be implemented using a one-dimensional array, as illustrated in FIG. 9B. Multiple primary indexes can be implemented using an array having a number of dimensions equal to the number of primary indexes. For example, two primary indexes can be implemented using a two-dimensional array, as illustrated in FIG. 9C. To enable creation of a primary index or indexes, the records of a cube must first be sorted according to the values of the primary index atom(s) so that all records having the same primary index atom value(s) are arranged in a contiguous block in the cube. For a single primary index, the primary index array stores, for each value of the primary index atom, the index (i.e., location) in the cube of the first record having that primary index atom value. For multiple primary indexes, the primary index array stores, for each possible combination of values of the primary index atoms, the index in the cube of the first record having that combination of primary index atom values. (A primary index array also implicitly indicates the last record in a contiguous series of records having a particular primary index atom value or combination of primary index atom values, the last record being the record immediately preceding the first record storing the primary index atom value or combination of primary index atom values for the next element in the primary index array.) Since the number of possible values of an atom is typically several orders of magnitude smaller than the number of records, the size of a primary index array will be only a small fraction of the size of the cube, resulting in large data storage savings compared to a conventional index (i.e., an index which includes an entry for each record in the cube), a characteristic that is particularly advantageous in implementing a main-memory OLAP system according to the invention. Since the size of a primary index array grows exponentially with the number of primary indexes (the size is the product of the numbers of possible values for all primary index atoms), it can be desirable to use few primary indexes.

FIG. 10 illustrates a procedure to aggregate a cube, using one primary and one secondary index. Secondary indexes are best described referring to FIG. 10, which illustrates the procedure to aggregate the cube for the case of one primary index and one secondary index. Assume that the query has filters for both the primary and secondary indexes. After an index range of records that passes the primary filter is identified, a binary search or dictionary search is used over these indexes to find an index for which the record passes the secondary filter. If an index is found, aggregation is started in both directions from this index. The FilterAggregate( ) procedure called in the process is equivalent to the body of the outer loop of the AggregateCube step illustrated in FIG. 6. Note that whenever FilterAggregate( ) is reached, the primary and secondary filters are guaranteed to be passed, and the query parser can remove these filters from the Filters list.

IV. Result Table Slices

An OLAP system according to the invention can be implemented to support queries that return records in "raw data" form, i.e., queries that produce a result table without aggregation of records. However, for raw data queries, the number of rows in the result table can be large (at the extreme, the result table can include all records in the cube if the query doesn't include a FILTERS element or operation of the FILTERS element doesn't result in the exclusion of any records from the result table), which can result in long execution times for both communication of the result table to a client application that initiated the query and handling of the result table by the client application. To enable more efficient communication and handling of result tables produced by raw data queries, an OLAP system according to the invention can be implemented to enable a query to include a specification of a part ("slice") of the result table for communication to, and handling by, a client application.

FIG. 11A illustrates a query directed to the cube illustrated in FIG. 5A that returns a "slice" of a result table that includes unaggregated records. The FILTERS element of the query allows only records having a Service score between 1 and 4 to be included in the result table. The COLUMNS element causes the values for the Time, Gender, Service and Responseld atoms to be included for each record included in the result table. The SORT element of the query sorts the records included in the result table, first in increasing order of Service score, then, for each group of Service scores, in decreasing order of time (i.e., the latest records appear first in the result table). The two numerical values at the end of the SORT element specify the slice of the result table that is to be returned to a client application: the first value specifies the first row (record) of the result table to include in the slice and the second value specifies the number of rows (records) to include in the slice. As illustrated in FIG. 11A, the query includes rows 100 through 124 in the result table slice. (Note that without inclusion in the query of the two numerical values at the end of the SORT element, the result table would include all records having a Service score between 1 and 4, sorted as indicated above.) The query illustrated in FIG. 11A enables specification of a slice that includes a contiguous set of records from a result table. However, generally, a result table slice can be specified in any manner to cull any subset of records from a result table. For example, a result table slice can include multiple contiguous sets of records that are each separated from other contiguous set(s) of records in the result table slice by at least one record. Or, for example, a result table slice can be specified to include records selected from the original result table at regular intervals, i.e., every nth record (such as every other record).

Implementation of the invention to enable specification of result table slices including a contiguous set of records advantageously corresponds to the way in which a search engine typically deals with displaying the results of a search that finds a large number of items ("hits"), i.e., by grouping the items in pages that each include a specified number of items (e.g., 10 items per page), displaying one page of items at a time, and allowing navigation between pages of items. Such an implementation of the invention can further be implemented to enable navigation among result table slices of a specified size (and having a specified row as the first row for an initial result table slice).

FIG. 11B illustrates a data structure (referred to herein as the CubeIndexes array) that can be used to enable result table sorting and to produce a result table slice. A query execution procedure can create the CubeIndexes array and initialize the array with the indexes of all records (i.e., locations in a data storage device, such as addresses in a main memory, of the beginning of each record) that pass the query's filter(s). If necessary to satisfy the query, a SORT element of a query execution procedure can sort the CubeIndexes array in accordance with parameter(s) of the SORT element (see, e.g., the discussion above of the SORT element of the query of FIG. 11A). Additionally or alternatively, if necessary to satisfy the query, a result table slice can be produced in accordance with parameter(s) specified as part of the query. For example, such parameter(s) can be specified as part of a SORT element of the query (see, e.g., the discussion above of the numerical values 100 and 25 specified as part of the SORT element of the query of FIG. 11A). Note that the data storage requirements of the CubeIndexes array are modest (particularly as compared to the requirements for storing the entire cube or result table)—in the worst case, one index for every record of the cube. Additionally, use of the CubeIndexes array facilitates manipulation of the cube records for eventual inclusion in the result table and result table slice(s): the record indexes can be manipulated rather than manipulating a copy of the cube.

As described above, the invention can be implemented to enable specification of a "slice" of a result table including rows produced without aggregation of records. However, the invention can also be implemented to enable specification of a "slice" of a result table including rows produced with aggregation of records. However, the advantages associated with providing a result table slice are typically diluted for such an implementation, since such a result table typically has far fewer rows than a result table that includes rows produced without aggregation of records.

V. Parallel OLAP System

In accordance with the invention, an OLAP system can be parallelized to run on a cluster of computers. In particular, according to the invention, a main memory OLAP system can be parallelized to run on a cluster of computers. A parallel OLAP system according to the invention has several advantageous characteristics. First, a parallel OLAP system according to the invention can use the combined data storage capacity of multiple computers to store the OLAP data cube, enabling scalability of the OLAP system to large cubes. This can be particularly advantageous in a main memory parallel OLAP system according to the invention. Second, in a parallel OLAP system according to the invention, the work performed during query execution can be distributed over the multiple computers, speeding up query execution times; when the work performed during query execution is distributed evenly over multiple computers, close-to-linear speedups (i.e., speedup in direct proportion to the number of computers used) of query execution times can result. Third, a parallel OLAP system according to the invention can be implemented so that nodes of the computer cluster need communicate little during query execution and/or so that communication between nodes requires little communication capacity, resulting in the imposition of only modest network bandwidth requirements by the parallel OLAP system. Finally, a parallel OLAP system according to the invention can be implemented to enable automatic recovery from node failures, resulting in an OLAP system having high reliability.

FIG. 12 is a block diagram of a parallel OLAP system 1200 according to an embodiment of the invention. The parallel OLAP system 1200 includes multiple nodes, each of which can be classified into one of three node categories: master node, distributor node and aggregator node. Each type of node is discussed in more detail below. The nodes of the parallel OLAP system 1200 communicate with each other via a network (network 1201 in FIG. 12) that is adapted to enable communication among apparatus of the type used to implement the nodes. It is anticipated that the network will typically be a computer network (e.g., Internet, intranet). In particular, it is anticipated that a parallel OLAP system according to the invention will typically be implemented on a local area network (LAN). However, other types of networks can be used, in addition to or instead of a computer network, to enable communication among nodes of a parallel OLAP system according to the invention, such as a telephone network and/or satellite network. Further, the network(s) can be implemented to enable wired and/or wireless communication between nodes.

An OLAP data cube is stored on a data storage device (cube storage 1202 in FIG. 12). Generally, the cube can be stored on any type of data storage device. To facilitate rapid retrieval of parts of the cube (cube partitions) for transmission to aggregator nodes, as discussed in more detail below, it can be desirable to use a data storage device enabling fast read access (e.g., a RAID data storage device). The master node of a parallel OLAP system according to the invention (master node 1211 is illustrated in FIG. 12) manages the assignment and distribution of cube partitions to aggregator nodes (aggregator nodes 1231, 1232 and 1233 are illustrated in FIG. 12). The master node can also store the operational status of each aggregator node. A parallel OLAP system according to the invention can be implemented so that the cube storage can be directly accessed via the network and/or via the master node.

A distributor node of a parallel OLAP system according to the invention (distributor nodes 1221 and 1222 are illustrated in FIG. 12) receives OLAP quer(ies) from a client application or client applications (client applications 1241 and 1242 are illustrated in FIG. 12). When a parallel OLAP system according to the invention includes multiple distributor nodes (as does the parallel OLAP system 1200), queries transmitted by client application(s) can (but need not necessarily) be routed through a load balancer (load balancer 1251 is illustrated in FIG. 12), which distributes queries in a manner that attempts to balance the workload of the distributor nodes in handling queries. A load balancer for use with a parallel OLAP system according to the invention can be implemented using methods and apparatus known to those skilled in the art; load balancers that can be used with the invention are readily commercially available. For each query received, a distributor node transmits the query to multiple aggregator nodes which each have received a cube partition (i.e., a copy of the data representing the cube partition) and are "active" (i.e., intended to be used for executing a query with respect to the cube partition received by that aggregator node). The cube partition can be stored at the aggregator node (e.g., in a main memory parallel OLAP system according to the invention, the cube partition is stored in the aggregator node's main memory). The query received by an active aggregator node is executed with respect to the cube partition received by that aggregator node and the result of the query execution is transmitted to the distributor node. The distributor node collects the (partial) query execution results from each aggregator node to which the query was distributed, combines the partial query execution results into a complete query execution result (e.g., a result table or a result table slice) and transmits the complete query execution result back to the client application.

A typical configuration of a parallel OLAP system according to the invention includes one or a few distributor nodes, and several or many aggregator nodes, i.e., more—and often many more—aggregator nodes than distributor nodes. A parallel OLAP system according to the invention can be implemented so that distributor node and master node functionality are combined in a single node (and in the same apparatus); in particular, this can be done when a parallel OLAP system according to the invention includes a small number of nodes. Moreover, a parallel OLAP system according to the invention can be implemented so that two or more nodes (e.g., the master node and a distributor node) are embodied in the same apparatus. When a parallel OLAP system according to the invention includes a large number of nodes, the nodes can be arranged in a tree structure (typically flat and wide), with aggregator nodes at the leaf level and distributor nodes in the branches at higher levels. Such an architecture can make scaling a parallel OLAP system according to the invention to large cubes easier and can reduce the distributor nodes' portion of query execution time.

Figure 13:
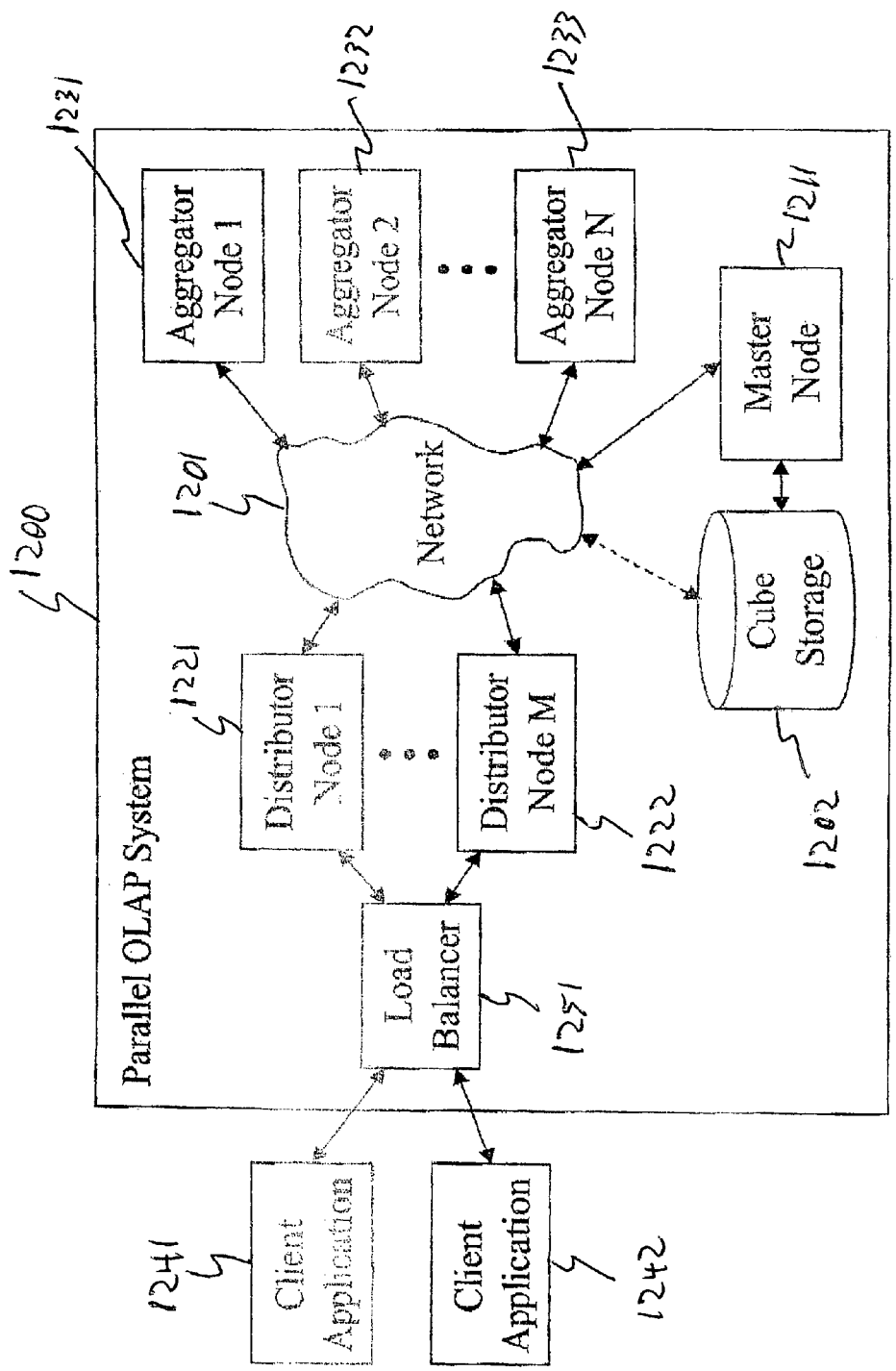
FIG. 13 illustrates a part of a computer cluster including a collection of computers connected by a network that can be used to implement a parallel OLAP system according to an embodiment of the invention.
Figure 13:
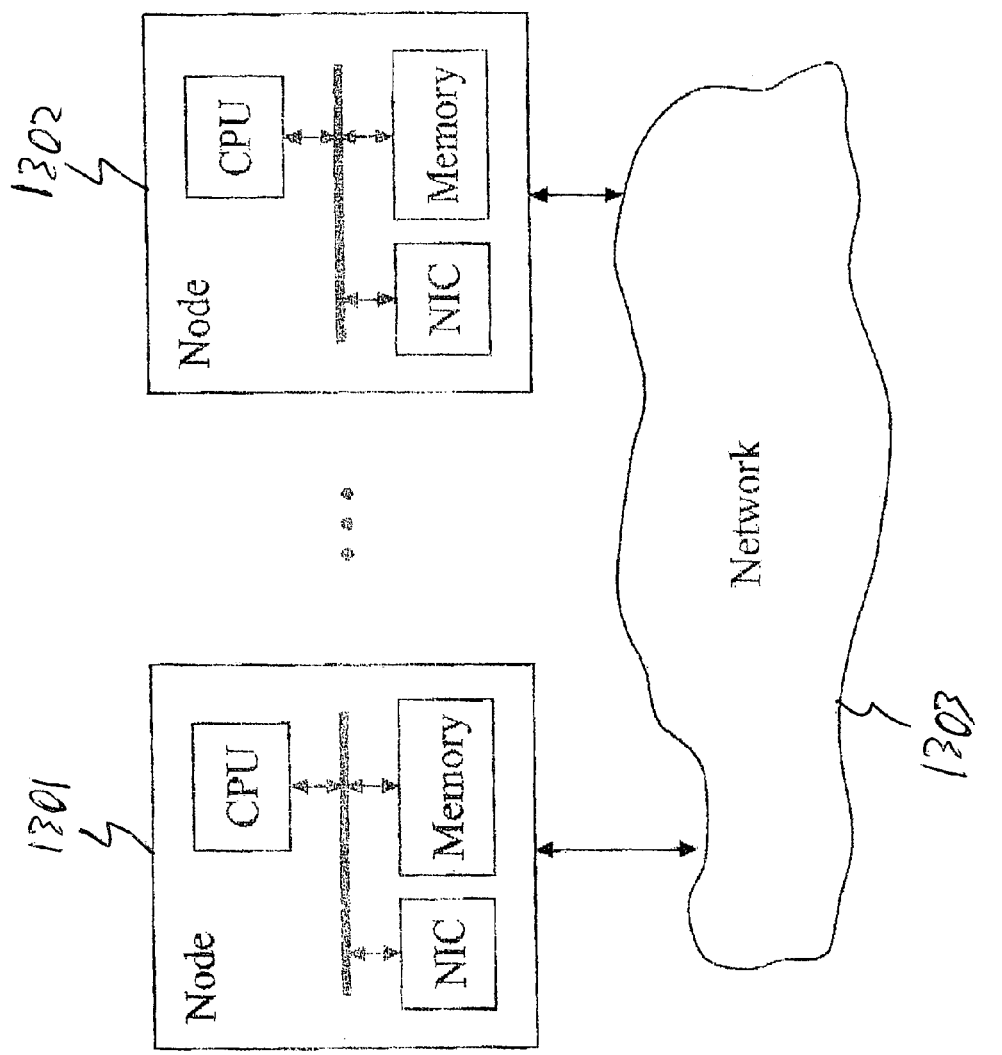

Each of the nodes of a parallel OLAP system according to the invention can, and typically will, be embodied by a computer. Herein, "computer" can encompass any device or apparatus having adequate computational capability to perform the functions of the invention that are necessary for that computer, as described herein. FIG. 13 illustrates a part of a computer cluster including a collection of computers (to simplify illustration of the invention only two computers 1301 and 1302 are shown in FIG. 13) connected by a network 1303 that can be used to implement a parallel OLAP system according to an embodiment of the invention. Each of the computers (e.g., computers 1301 and 1302 of FIG. 13) used to implement a node of a parallel OLAP system according to the invention can be implemented by a computer system as discussed above with respect to FIG. 3. In FIG. 13, to simplify illustration of the invention, only the major components, i.e., CPU, main memory and network interface (NIC), of each computer are shown.

Figures 14A, 14B:
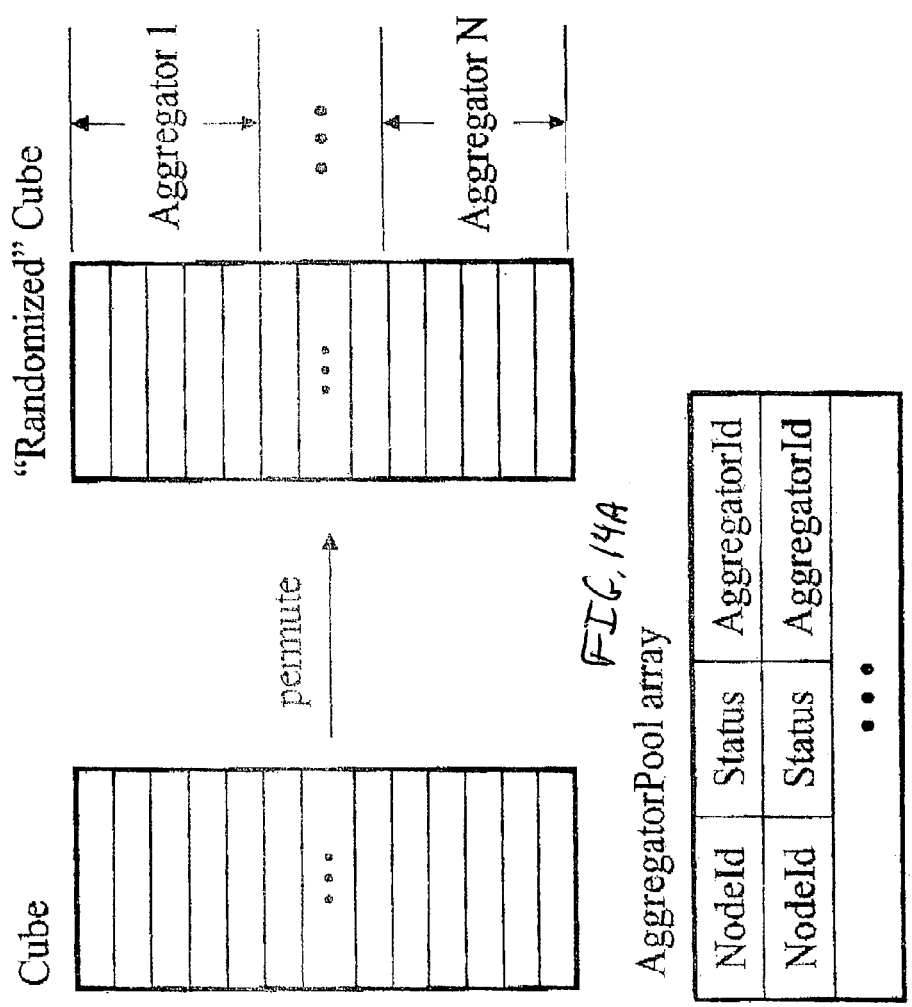
FIG. 14A illustrates how parts of a cube can be assigned to aggregator nodes by a master node.
FIG. 14B illustrates a data structure that can be used by a master node in keeping track of the operational status of aggregator nodes.

FIG. 14A illustrates how parts of a cube can be assigned to aggregator nodes by a master node. The master node randomly permutes the cube, then divides the permuted cube into partitions. In one embodiment, each partition of the randomized cube includes contiguous records. Each of multiple aggregator nodes are assigned one of the partitions. According to one embodiment of the invention, the partitions are all of approximately the same size; in a particular implementation, the randomized cube is divided into partitions whose sizes differ by at most one record. The foregoing approach implements randomized load balancing among the aggregator nodes. Since the number of records in a cube is typically very large, randomized load balancing can be shown to distribute work very evenly among the aggregator nodes, which is a desirable characteristic of a parallel OLAP system. In another embodiment of the invention, the size of each partition depends on characteristic(s) of the aggregator node to which the partition is assigned. For example, the size of the partition can be directly proportional to the processing speed and/or data storage capacity (e.g., main memory capacity) of the aggregator node.

FIG. 14B illustrates a data structure (referred to herein as the AggregatorPool array) that can be used by a master node in storing the operational status of aggregator nodes. The AggregatorPool array stores the node identification (identified in the AggregatorPool array by a particular value of NodeId) and status (identified in the AggregatorPool array by a particular value of Status) of each aggregator node (identified in the AggregatorPool array by a particular value of AggregatorId). The value of NodeId represents an aggregator node's address on the network and, typically, is the aggregator node's name or IP address. The value of Status is either "up" (the node is operational) or "down" (the node is non-operational).

As indicated above, a parallel OLAP system according to the invention can be implemented to enable automatic recovery from node failures. Each active aggregator node can be assigned an aggregator node identification (AggregatorId) by the master node. Upon start-up of an aggregator node, or reboot of the aggregator node after going down (i.e., becoming non-operational), the aggregator node contacts the master node to determine whether the aggregator node is active. The invention can be implemented so that the master node then causes the corresponding cube partition to be transmitted from the cube storage to, the aggregator node. Alternatively, the invention can be implemented so that the master node transmits the appropriate aggregator node identification to the aggregator node, which communicates with the cube storage to acquire the corresponding cube partition.

Figure 15:
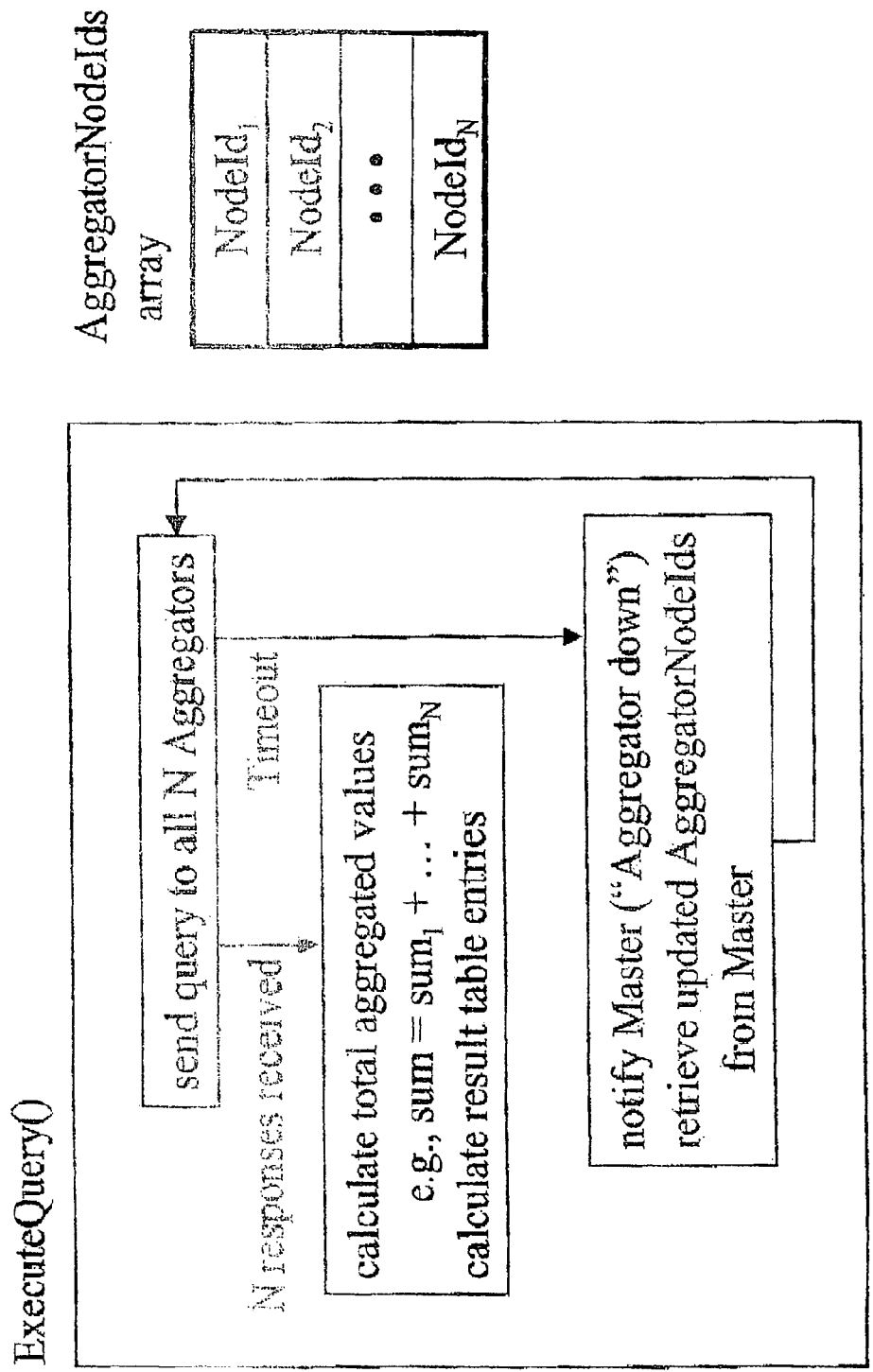
FIG. 15 illustrates a part of a procedure that can be performed by a distributor node to execute a query in a parallel OLAP system according to the invention.

FIG. 15 illustrates a part of a procedure that can be performed by a distributor node to execute a query in a parallel OLAP system according to the invention. Before the illustrated part of the procedure is executed, e.g., upon start-up or reboot of the distributor node, the distributor node contacts the master node to retrieve the node identifications (NodeIds) of all active aggregator nodes and stores the node identifications in an array (referred to herein as the AggregatorNodeIds array). The query execution procedure is invoked when a distributor node receives a query from a client application (or load balancer). The distributor node sends the query to all active aggregator nodes and waits to receive a response from each active aggregator node. The response an aggregator node returns includes aggregated values for each result table entry for the part of the cube stored at the aggregator node. The size (amount of data) of the response transmitted by each aggregator node is typically modest, since the size of the result table is typically modest; consequently, only modest network bandwidth requirements are imposed by this aspect of a parallel OLAP system according to the invention. In normal operation, the query execution procedure receives a response from all active aggregator nodes before a timeout occurs and proceeds to calculate the totals of the aggregated values for each result table entry for the entire cube. For example, when the aggregated value is a sum or count, the total aggregated value is the sum of the corresponding partial aggregated values provided by each aggregator node for the part of the cube stored at that aggregator node. After calculating the total aggregated values for each result table entry, the query execution procedure calculates each result table entry using those total aggregated values (and performing any other calculation(s) required by the query) and returns the result table (or slice thereof) to the client application. If there is a problem with one or more aggregator nodes, a timeout occurs and the distributor node notifies the master node that aggregator node(s) are down, retrieves updated node identifications from the master node (which include no aggregator node that has been reported to the master node to be down) and re-starts the procedure to execute the query. The query execution procedure proceeds again as described above. This process is repeated until all active aggregator nodes provide a response before a timeout occurs. The invention can be implemented so that, after a timeout occurs and updated node identifications are obtained by the distributor node, the distributor node re-sends the query only to those aggregator nodes assigned a cube partition for which no response was previously received; however, since it is anticipated that nodes will typically go down infrequently, implementation of the invention to include this optimization may be deemed to not be necessary. When a master node receives notification from a distributor node that an aggregator node is down, the master node updates the master node's AggregatorPool array so that each partition is assigned to an aggregator node that is up, then notifies all distributor nodes of the new aggregator nodes that the distributor nodes should use.

To enable recovery from failure of an aggregator node, a parallel OLAP system according to the invention can be implemented to include a number of aggregator nodes that is greater than the number of cube partitions that are to be distributed to aggregator nodes. This is necessary if each aggregator node can be assigned only one cube partition, as it is anticipated the invention will often be implemented. The extra aggregator nodes provide redundancy, being available for use if one of the active aggregator nodes becomes non-operational. The invention can also be implemented so that an aggregator node can be assigned more than one cube partition. In that case, redundancy can be provided even when the number of aggregator nodes is not greater than the number of cube partitions that are to be distributed to aggregator nodes. In fact, if the invention is implemented so that an aggregator node can be assigned more than one cube partition, the number of aggregator nodes can be less than the number of cube partitions, whether or not the invention is implemented to provide redundancy of aggregator node operation. However, the advantageous characteristics of a parallel OLAP system according to the invention can diminish when more than one cube partition can be assigned to an aggregator (or, for that matter, as the size of the cube partitions increases).

Some aspects of the above-described operation of a parallel OLAP system according to the invention can be modified. For example, a parallel OLAP system according to the invention can be implemented so that a distributor node does not retrieve node identifications of active aggregator nodes. Instead, the distributor node sends each query that the distributor node receives to all aggregator nodes. Only aggregator nodes that have been notified that they are active and that have received the assigned cube partition(s) respond to the query. If a distributor node determines that an aggregator node is down, the distributor node can communicate that information to the master node. The master node can then assign the relevant cube partition(s) to a replacement aggregator node and communicate with the replacement aggregator node so that those cube partition(s) are transmitted to the replacement aggregator node. The master node can communicate with the distributor node to indicate that a replacement aggregator node has been provided and the distributor node can again transmit the query to all aggregator nodes. Alternatively, the master node can communicate the identity of the replacement aggregator node to the distributor node, which then transmits the query only to that aggregator node.

A parallel OLAP system according to the invention can also be implemented so that each cube partition is provided to multiple aggregator nodes for possible use at the time of execution of a query. The AggregatorPool array maintained by the master node can be modified to identify, for each cube partition, an active aggregator node to which that cube partition has been assigned, as well as one or more inactive aggregator nodes (backup aggregator node(s)) to which that cube partition has been assigned. The backup aggregator nodes can acquire the cube partition in the same manner as that described above with respect to acquisition of the cube partition by an active aggregator node. Such an implementation may be desirable so that, when an active aggregator node goes down, time need not be spent by a new aggregator node in obtaining the cube partition, which may otherwise decrease the speed with which the query response can be produced.

As indicated above, a parallel OLAP system according to the invention can be implemented to include multiple distributor nodes. A parallel OLAP system according to the invention including multiple distributor nodes can be implemented so that different queries are transmitted to different distributor nodes for execution. Such an implementation may be desirable, for example, for OLAP systems that can be required to respond to a large number of queries, e.g., an OLAP system that must respond to queries from a large number of client applications. Additionally or alternatively, a parallel OLAP system according to the invention including multiple distributor nodes can be implemented in a manner similar to that described above with respect to redundant aggregator nodes so that, if a distributor node goes down, quer(ies) that were to be executed by that distributor node are transmitted to a new distributor node for execution, i.e., the OLAP system includes redundant distributor nodes. Such an implementation can increase the reliability of the OLAP system.

The invention can be implemented, in whole or in part, by one or more computer programs and/or data structures, or as part of one or more computer programs and/or data structure(s), including instruction(s) and/or data for accomplishing the functions of the invention. For example, such computer program(s) and/or data structure(s) can include instruction(s) and/or data, depending on the embodiment of the invention, for accessing records in a cube, filtering the records of a cube, aggregating the records of a cube and/or performing other calculations for producing result table entries, producing and using primary and secondary indexes, producing a result table slice, assigning and distributing parts of a cube to aggregator nodes, storing the operational status of aggregator nodes, and/or distributing a query to aggregator nodes. Those skilled in the art can readily implement the invention using one or more computer program(s) and/or data structure(s) in view of the description herein.

Further, those skilled in the art can readily appreciate how to implement such computer program(s) and/or data structure(s) to enable execution on any of a variety of computational devices and/or using any of a variety of computational platforms.

Various embodiments of the invention have been described. The descriptions are intended to be illustrative, not limitative. Thus, it will be apparent to one skilled in the art that certain modifications may be made to the invention as described herein without departing from the scope of the claims set out below.

I claim:

1. A method for facilitating aggregation of records of an OLAP data cubs, each record of the OLAP data cube comprising a value for each of a plurality of atoms which each represent a variable of an OLAP system, wherein the records of the OLAP data cube are ordered in accordance with the values of first and second atoms for each record, thereby producing a sorted OLAP data Cube, such that each record having a specified value of the first atom is located in the sorted OLAP data cube in a contiguous group together with other records, if any, of the OLAP data cube having the same specified value of the first atom, and such that within each contiguous group of one or more records having the same specified value of the first atom, each record having a specified value of the second atom is located in a contiguous subgroup together with other records, if any, having the same specified value of the second atom, the method using a computer system to perform the steps of:

identifying a contiguous group of one or more records having a value of the first atom that matches a value of the first atom identified by a first filter data structure, wherein the contiguous group of one or more records is identified using a data structure that identifies each possible value of the first atom, together with the location in the sorted OLAP data cube of a first record of a contiguous group of one or more records having that value of the first atom;

identifying a record of the identified contiguous group having a value of the second atom that matches a value of the second atom identified by a second filter data structure;

successively evaluating one or more records of the identified contiguous group in a first direction away from the identified record, beginning with the record that is adjacent to the identified record in the first direction, to determine, for each evaluated record, whether the evaluated record has a value of the second atom that matches the value of the second atom identified by the second filter data structure, wherein:

if the evaluated record has a value of the second atom that matches the value of the second atom identified by the second filter data structure, the evaluated record is identified as a record to be included in the aggregation and the step of successively evaluating in a first direction continues with the next adjacent record in the first direction;

if the evaluated record does not have a value of the second atom that matches the value of the second atom identified by the second filter data structure, the step of successively evaluating in the first direction terminates;

successively evaluating one or more records of the identified contiguous group in a second direction away from the identified record that is opposite to the first direction, beginning with the record that is adjacent to the identified record in the second direction, to determine, for each evaluated record, whether the evaluated record has a value of the second atom that matches the value of the second atom identified by the second filter data structure, wherein:

if the evaluated record has a value of the second atom that matches the value of the second atom identified by the second filter data structure, the evaluated record is identified as a record to be included in the aggregation and the step of successively evaluating in the second direction continues with the next adjacent record in the second direction;

if the evaluated record does not have a value of the second atom that matches the value of the second atom identified by the second filter data structure, the step of, successively evaluating in the second direction terminates.

2. A method as in claim 1, further comprising the step of the records of the OLAP data cube to produce the sorted OLAP data cube.

3. A method as in claim 2, further comprising the step of aggregating the record or records identified for inclusion in the aggregation in the steps of successively evaluating.

4. A method as in claim 1, further comprising the step or aggregating the record or, records identified for inclusion in the aggregation in the steps of successively evaluating.

5. A method as in claim 1, wherein the step of identifying a record of the identified contiguous group comprises the step of performing a binary search to identify the record.

6. A method as in claim 1, wherein the step of identifying a record of the identified contiguous group comprises the step of performing a dictionary search to identify the record.

7. A method as in claim 1, wherein
the OLAP data cube, the first filter data structure and the second filter data structure are stored in a main memory.

8. A computer readable medium or media encoded with one or more computer programs and/or data structures for facilitating aggregation of records of an OLAP data cube, each record of the OLAP data cube comprising a value for each of a plurality of atoms which each represent a variable of an OLAP system, wherein the records of the OLAP data cube are ordered in accordance with the Values of first and second atoms for each record, thereby producing a sorted OLAP data cube, such that each record having a specified value of the first atom is located in the sorted OLAP data cube in a contiguous group together with other records, if any, of the OLAP data cube having the same specified value of the first atom, and such that within each contiguous group of one or more records having the same specified value of the first atom, each record having a specified value of the second atom is located on a contiguous subgroup together with other records, if any, having the same specified value of the second atom, the one or more computer programs and/or data structures, comprising:

instructions and/or data for identifying a contiguous group of one or more records having a value of the first atom that matches a value of the first atom identified by a first filter data structure, wherein the instructions and/or data comprise a data structure that identifies each possible value of the first atom, together with the location in the sorted OLAP data cube of a first record of a contiguous group of one or more records having that value of the first atom;

instructions and/or data for identifying a record of the identified contiguous group having a value of the second atom that matches a value of the second atom identified by a second filter data structure;

instructions and/or data for successively evaluating one or more records of the identified contiguous group in a first direction away from the identified record, beginning with the record that is adjacent to the identified record in the first direction, to determine, for each evaluated record, whether the evaluated record has a value of the second atom that matches the value of the second atom identified by the second filter data structure, wherein:
- if the evaluated record has a value of the second atom that matches the value of the second atom identified by the second filter data structure, the evaluated record is identified as a record to be included in the aggregation and the successive evaluation in a first direction continues with the next adjacent record in the first direction;
- if the evaluated record does not have a value or the second atom that matches the value of the second atom identified by the second filter data structure, the successive evaluation in the first direction terminates;

instructions and/or data for successively evaluating one or more records of the identified contiguous group in a second direction away from the identified record that is opposite to the first direction, beginning with the record that is adjacent to the identified record in the second direction, to determine, for each evaluated record, whether the evaluated record has a value of the second atom that matches the value of the second atom identified by the second filter data structure, wherein:
- if the evaluated record has a value of the second atom that matches the value of the second atom identified by the second filter data structure, the evaluated record is identified as a record to be included in the aggregation and the successive evaluation in the second direction continues with the next adjacent record in the second direction;
- if the evaluated record does not have a value of the second atom that matches the value of the second atom identified by the second filter data structure, the successive evaluation in the second direction terminates.

9. A computer readable storage medium or media as in claim 8, further comprising instructions and/or data for ordering the records of the OLAP data cube to produce the sorted OLAP data cube.

10. A computer readable storage medium or media as in claim 9, further comprising instructions and/or data for aggregating the record or records identified for inclusion in the aggregation by the instructions and/or data for successively evaluating.

11. A computer readable storage medium or media as in claim 8, further comprising instructions and/or data for aggregating the record or records identified for inclusion in the aggregation by the instructions and/or data for successively evaluating.

12. A computer readable storage medium or media as in claim 8, wherein the instructions and/or data for identifying a record or the identified contiguous group comprise instructions and/or data for performing a binary search to identify the record.

13. A computer readable storage medium or media as in claim 8, wherein the instructions and/or data for identifying a record of the identified contiguous group comprise instructions and/or data for performing a dictionary search to identify the record.

14. A computer readable storage medium or media as in claim 8, wherein the OLAP data cube, the first filter data structure and the second filter data structure are stored in a main memory.

15. A computer system for facilitating aggregation of records of an OLAP data cube, each record of the OLAP data cube comprising a value for each of a plurality of atoms which each represent a variable of an OLAP system, wherein the records of the OLAP data cube are ordered in accordance with the values of first and second atoms for each record, thereby producing a sorted OLAP data cube, such that each record having a specified value of the first atom is located in the sorted OLAP data cube in a contiguous group together with other records, if any, of the OLAP data cube having the same specified value of the first atom, and such that within each contiguous group of one or more records having the same specified value of the first atom, each record having a specified value of the second atom is located in a contiguous subgroup together with other records, if any, having the same specified value of the second atom, the computer system comprising a processing device and main memory for use in:

identifying a contiguous group of one or more records having a value of the first atom that matches a value of the first atom identified by a first filter data structure, wherein the contiguous group of one or more records is identified using a data structure that identifies each possible value of the first atom, together with the location in the sorted OLAP data cube of a first record of a contiguous group of one or more records having that value of the first atom;

identifying a record of the identified contiguous group having a value of the second atom that matches a value of the secondd atom identified by a second filter data structure;

successively evaluating one or more records of the identified contiguous group in a first direction away from the identified record, beginning with the record that is adjacent to the identified record in the first direction, to determine, for each evaluated record, whether the evaluated record has a value of the second atom that matches the value of the second atom identified by the second filter data structure, wherein:
- if the evaluated record has a value of the second atom that matches the value or the second atom identified by the second filter data structure, the evaluated record is identified as a record to be included in the aggregation and the successive evaluation in a first direction continues with the next adjacent record in the first direction;
- if the evaluated record does not have a value of the second atom that matches the value of the second atom identified by the second filter data structure, the successive evaluation in the first direction terminates;

successively evaluating one or more records of the identified contiguous group in a second direction away from the identified record that is opposite to the first direction, beginning with the record that is adjacent to the identified record in the second direction, to determine, for each evaluated record, whether the evaluated record has a value of the second atom that matches the value of the second atom identified by the second filter data structure, wherein:
- if the evaluated record has a value of the second atom that matches the value of the second atom identified by the second filter data structure, the evaluated record is identified ac a record to be included in the aggregation and the successive evaluation in the second direction continues with the next adjacent record in the second direction;

if the evaluated record does not have a value of the second atom that matches the value of the second atom identified by the second filter data structure, the successive evaluation in the second direction terminates.

16. A computer system as in claim 15, wherein the processing device and main memory are further for use in ordering the records of the OLAP data cube to produce the sorted CLAP data cube.

17. A computer system as in claim 16, wherein the processing device and main memory are further for use in aggregating the record or records identified for inclusion in the aggregation by the successively evaluating.

18. A computer system as in claim 15, wherein the processing device and main memory are further for use in aggregating the record or records identified for inclusion in the aggregation by the successively evaluating.

19. A computer system as in claim 15, wherein the identifying a record of the identified contiguous group comprises performing a binary search to identify the record.

20. A computer system as in claim 15, wherein the identifying a record of the identified contiguous group comprises performing a dictionary search to identify the record.

21. A computer system as in claim 15, wherein the OLAP data cube, the first filter data structure and the second filter data structure are stored in the main memory.

* * * * *